United States Patent [19]
Bergqvist et al.

[11] Patent Number: 5,932,000
[45] Date of Patent: Aug. 3, 1999

[54] METHOD FOR PREPARATION OF A HARDENING COMPOSITION

[75] Inventors: Hans Bergqvist, Torslanda; Satish Chandra, Göteborg, both of Sweden

[73] Assignee: EKA Chemicals AB, Bohus, Sweden

[21] Appl. No.: 08/928,625

[22] Filed: Sep. 12, 1997

Related U.S. Application Data

[60] Provisional application No. 60/028,691, Oct. 18, 1996.

[30] Foreign Application Priority Data

Sep. 19, 1996 [SE] Sweden .................................. 9603418

[51] Int. Cl.⁶ .................................................. C04B 14/04
[52] U.S. Cl. .......................... 106/737; 106/726; 106/809; 106/819
[58] Field of Search .................................... 106/737, 725, 106/724, 726, 809, 819, 823

[56] References Cited

U.S. PATENT DOCUMENTS

| | | | |
|---|---|---|---|
| 4,310,486 | 1/1982 | Cornwell et al. | 106/737 |
| 4,888,058 | 12/1989 | Rosenberg et al. | 106/737 |
| 4,935,060 | 6/1990 | Dingsoyr | 106/803 |
| 5,250,113 | 10/1993 | Berke et al. | 106/737 |
| 5,389,144 | 2/1995 | Burge et al. | 106/737 |
| 5,472,501 | 12/1995 | Dastol | 106/823 |

FOREIGN PATENT DOCUMENTS

| | | |
|---|---|---|
| 0 519 155 A2 | 2/1992 | European Pat. Off. . |
| 0 692 465 A1 | 6/1995 | European Pat. Off. . |
| 1495811 | 3/1975 | United Kingdom . |
| WO 91/12214 | 2/1991 | WIPO . |

OTHER PUBLICATIONS

Wagner et al., "Nanosilica—ein Zusatz für dauerhaften Beton," Wiss. Z. Hochsch. Archit. Bauwes.—Weimar 40 (1994), pp. 183–187, (no month).

Luping et al., "Rapid Determination of the Chloride Diffusivity in Concrete by Applying an Electrical Field," ACI Materials Journal, vol. 89, No. 1, pp. 49–53, Jan.–Feb. 1992.

Iler, Ralph K., *The Chemistry of Silica*, John Wiley & Sons, Inc., 1979, pp. 312, 346 and 347, (no month).

Papers from the Ralph K. Iler Memorial Symposium, The Colloid chemistry of silica: developed from a symposium sponsored by the Division of Colloid and Surface Chemistry at the 200th National Meeting of the American Chemical Society, Washington, DC, Aug. 26–31, 1990/Horacio E. Bergna, editor, pp. 54 and 55, (no month).

Ullmann's Encyclopedia of Industrial Chemistry, ed. Wolfgang Gerhartz, vol. A 5, 1986, pp. 489–537, (no month).

*Primary Examiner*—Michael Marcheschi
*Attorney, Agent, or Firm*—McDermott, Will & Emery

[57] ABSTRACT

A method for preparing concrete or mortar in which a mixture of a hydraulic binder, aggregates, water, and colloidal silica is prepared. The relative standard deviation of the particle size distribution by numbers of the colloidal silica is at least about 30%. The invention also relates to concrete or mortar obtainable by the method.

20 Claims, No Drawings

METHOD FOR PREPARATION OF A HARDENING COMPOSITION

This application claims priority of Provisional Application No. 60/028,691, filed Oct. 18, 1996.

The present invention relates to a method for preparation of concrete or mortar having improved strength and durability properties. It also relates to concrete and mortar obtainable by the method, and to the use of said concrete, particularly as construction concrete, as well as to the use of said mortar.

Concrete is an artificial stone, commonly used as a building material, in which aggregates of suitable sizes are bound together by a matrix of a hydraulic binder. Usually the aggregates are stones, in the broad sense, and the hydraulic binder a cement. Concrete normally contains more aggregates than hydraulic binder, at least when calculated on volume basis. The aggregates commonly have a particle size distribution in the range of about 0.01–100 mm. In order to prepare concrete the aggregates and the hydraulic binder are mixed with water. Furthermore, concrete may contain certain additives such as setting and hardening additives, usually called accelerators, or workability additives, usually called superplasticiser. Mortar is distinguished by the maximum size of its aggregates: in general, mortar contains only aggregates with a maximum size of about 2–4 mm, e.g. sand. The concepts of cement, concrete, and mortar are furthermore extensively discussed in Ullman's encyclopedia of industrial chemistry, 5th ed., Vol. A5, pp. 490–538, VCH, Weinheim, Germany 1986, hereby incorporated by reference. Below, mortar is comprised, for brevity's sake, by the concept of "concrete".

One important property of concrete is obviously its strength. An important parameter controlling concrete strength is the water:cement ratio. Other factors are the type of cement, curing conditions, moisture content, degree of hydration of the cement, and the grading and shape of aggregates. If sufficient water is provided, the hydration of cement will continue over a period of several years, and concrete strength may increase continuously during this time. Conventionally, high strength is achieved by using a low water:cement ratio; superplasticisers are often used in this connection as they permit the use of lower water:cement ratios. Another way of improving the strength is to add silica fume, which is a pozzolanic waste material from silicon and ferrosilicon industries, having particle sizes of about 0.1–0.2 mm. Silica fume contains however unburnt coal, that gives the concrete a dark, usually undesired, colour, as well as other impurities, such as small quantities of metallic silicon that may cause explosion spalling of the concrete if it gets into contact with water.

Wagner and Hauck disclose in Hochsch. Archit. Bauwes. - Weimar 40 (1994) 5/6/7, pp. 183–7 the use of synthetically produced, chemically pure, and completely amorphous silica having an average particle size of 15 nm, which they call "nanosilica", instead of silica fume, which is referred to as "microsilica". The nanosilica particles are indicated to have specific surface areas in the range of 180–230 $m^2/g$, suggesting a rather narrow particle size distribution; in this connection it should be said that according to "The Chemistry of Silica", Ralph K. Iler, Wiley & Sons 1979, pp. 346–7, hereby incorporated by reference, the specific surface area of silica may be transformed into the corresponding particle size, and vice versa, using the formula $2720/A_d = d_s$, where $A_d$ is the specific surface area in $m^2/g$ and $d_s$ is the particle size in manometers. The impurity problems associated with silica fume are greatly overcome by the use of nanosilica. The concrete strength development is indicated to be about the same as if microsilica were used; the early strength development, i.e. from 1 to 7 days, is inferred by table 2 of the reference to be at most 36%. Agglomeration of the nanosilica is not discussed.

In EP-A2-0,519,155 a silica sol similar to nanosilica is used in shotcrete, primarily to provide the shotcrete with better cohesive properties, which in turn gives a lower degree of dust formation and rebound during the shotcreting. The cohesive effect is accomplished by promoting aggregation of the colloidal silica. The disclosed silica sol, which have particle sizes in the range of 7–40 nm and specific surfaces in the range of 50–700 $m^2/g$, shows a positive impact on the early strength compared to the effect of silica fume. The development of compressive strength from one to seven days is, in absence of accelerators, about 58%. Strength at later age is not mentioned. It has however been found (by the inventors of the present invention) that aggregation, i.e. gelling, coagulation, flocculation, or coarcevation, of the colloidal silica has a negative influence on the long term strength when compared to concrete in which silica fume is used, especially when higher doses of silica colloid are used, or if not mixed properly with the concrete mixture; this is probably due to encapsulation of the cement particles by the silica, which in turn is a hindrance to further hydration of the cement particles. No suggestion is given in EP-A2-0,519,155 about the particle size distribution.

The problem to be solved by the present invention is to provide a method for preparing concrete having enhanced early strength while having a good long term strength.

This problem is solved by the method defined by appended claim 1. According to this method, a mixture of an hydraulic binder, aggregates; water, and colloidal silica, is prepared, whereby the relative standard deviation of the particle size distribution of the colloidal silica is at least about 30%, preferably at least about 35%, and in particular at least about 40%. In this context "colloidal silica" means stable dispersions or sols of discrete particles of amorphous silica; this definition is the same as put forward in "The Chemistry of Silica" by Ralph K. Iler, page 312, Wiley & Sons 1979. The relative standard deviation of the particle size distribution is the ratio between the mean particle size by numbers and the standard deviation of the particle size distribution. "Variation coefficient" and "coefficient of variation" are terms synonymous to "relative standard deviation". The reason behind the positive effect of the broad particle size distribution on the strength parameters is not known, although a plausible hypothesis is that the smaller particles have a stabilising influence on the larger ones against aggregation.

The present invention has the additional advantages of providing concrete having good durability, especially against chemical attacks from, for instance, chlorides, sulphates, carbon dioxide, nitrogen oxides, and water. Furthermore, the obtained concrete has a high ultimate strength and good frost resistance. A particular advantage associated with the present invention is that the final concrete products have a most homogeneous and uniform strength.

The hydraulic binder is preferably a portland cement.

Preferably, the silica particles used in the present method have an average specific surface area below about 200 $m^2/g$, in particular below about 180 $m^2/g$, and preferably in the range of about 50–170 $m^2/g$. Above 200 $m^2/g$ it becomes increasingly difficult to counteract aggregation.

It is also preferred that the silica particles used in the present method have a particle size distribution the standard deviation of which is at least about 20 nm. The particle size distribution may be monomodal, i.e. have one particle size with a higher frequency of occurrence than the immediately adjacent sizes, or be polymodal, i.e. have two or more such particle sizes.

The silica particles preferably have a mean particle size by numbers of about 7–50 nm, particularly of about 10–30.

In the present method the particles are preferably added in form of an aqueous suspension containing about 8–60 percent by weight, in particular about 30–50 percent by weight, of silica. The particles are generally of a size of about 5–200 nm, preferably 10–100 nm, and they are preferably added to the mixture in an amount of about 1–8 percent by weight, in particular about 1–5 percent by weight, and especially about 2 percent by weight, calculated on the weight of the hydraulic binder. According to a preferred embodiment of the present invention the method also includes addition of a superplasticiser. Any suitable superplasticiser may be used, but it is preferred that it comprises a sulphonated naphthalene-formaldehyde resin, a sulphonated melamine-formaldehyde resin, or a sulphonated melamine-urea-formaldehyde resin, or a mixture thereof. Exemplary of useful superplasticiser are those disclosed in WO 91/12214 and EP 692,465, both of which are hereby incorporated by reference.

A part or all of the superplasticiser is preferably added to the concrete mixture before the colloidal silica, as this way of adding has shown to have a stabilising effect on the colloidal silica. In a particularly preferred embodiment of the present method about 35–55 percent by weight, preferably about 55 percent by weight, of the superplasticiser, based on the total amount of superplasticiser, is added before the colloidal silica.

The colloidal silica need not be stabilized by any stabilizing agent. It could, for instance, be silica sol prepared by the ion-exchange method as set forth in "The Colloid Chemistry of Silica", Horacio E. Bergna (Ed.), American Chemical Society 1994. Preferably, however, the colloidal silica is stabilized, in particular with alkaline substances, advantageously by ions of alkaline metals, e.g. of Na, K, or Li, or by ammonium ions ($NH_4$), or a combination thereof. In a preferred embodiment the amount of stabilizing alkaline substance is governed by a molar ratio $SiO_2:M_2O$ of from about 150:1 to about 300:1, whereby M represents Na, K, Li, or $NH_4$.

Accelerators, such as conventionally used in shotcrete, are preferably not used, or only used in insignificant amounts, when preparing concrete according to the present method.

According to a preferred embodiment of the present invention, concrete is prepared by mixing about 100 parts by weight of hydraulic binder; about 100–1000 parts by weight of aggregates; up to about 5 parts by weight of colloid silica; up to about 5 parts by weight of superplasticiser; and about 25–75 parts by weight of water.

The present invention also relates to concrete obtainable by the method according to the present invention as set forth above. According to one embodiment of the present invention concrete obtainable by said method is preferably used as construction concrete, which concept in the present context does not comprise shotcrete. The concept of "concrete" also comprises special concretes such as heavyweight concrete, lightweight concrete, fibre-reinforced concrete, and massive concrete.

Below, the present invention is illustrated by means of non-limiting examples.

EXAMPLE 1

An anionic silica sol stabilized with $NH_4^+$ and containing less than 0.05% of $Na_2O$ was used. The specific surface area was 80 $m^2/g$, the mean particle diameter by numbers was 35 nm with a standard deviation by numbers of 25 nm, i.e. the relative standard deviation was 71%. 95% by numbers of the particles had a size within the range from 5–150 nm. The silica sol was present as a dispersion containing 40 percent by weight of the solid particles, based on the dispersion. A mixture was prepared of 500 g standard portland cement, 1500 g standard sand 1,2,3, 7.5 g superplasticiser "Mighty 100", which is a sulphonated naphthalene formaldehyde condensate available from the Japanese company Kao Chemicals, and 62.5 g of the silica sol dispersion, whereby 50% of the total added amount of superplasticiser was added to the mixture before addition of the silica sol. The water:cement ratio was 0.4. Fresh density was 2195 $kg/m^3$, and 4×4×16 cm mortar prism samples were cast. The samples were cured for one day in steal frames, five days in water, and later in a climate room at 20° C. and 55% RH. The flexural and compressive strengths were measured after one, three, and seven days, by means of standard methods SS 13 42 33 and SS - EN 196.1, respectively. The results are set forth in Table I below.

TABLE I

| Days | Flexural strength, MPa | Compressive strength, MPa |
|---|---|---|
| 1 | 5.4 | 30.7 |
| 3 | 8.8 | 40.2 |
| 7 | 6.5 | 50.7 |
| strength development in 1–7 days, % | 20 | 65 |

As can be seen in Table I the development of compressive strength from one to seven days clearly surpasses the development suggested in EP-A2-519,155; in fact even the actual compressive strength is higher.

EXAMPLE 2

Mortars were made with different amounts of an anionic colloidal silica sol containing 0.22% of $Na_2O$. The specific surface area of the silica particles was 80 $m^2/g$, the mean particle diameter by numbers was 62 nm with a standard deviation by numbers of 28 nm, i.e. the relative standard deviation was 45%. 95% by numbers of the particles had a size within the range of 62 nm +/−56 nm. The silica sol was present as a dispersion containing 50 percent by weight of the solid particles. The mortars has cement:sand ratios of 1:3. Standard portland cement, supplied by Cementa AB, Slite, Sweden, and standard sand, grade 1, 2, and 3 were used. Mighty 100 was used as superplasticiser in an amount of 1.5 percent by weight, based on the weight of the cement; about 50% of the plasticiser was added before the colloidal silica sol was added. Table II below shows the weight percentages of silica sol, based on the cement, together with the water: cement ratios, the fresh densities, the air contents, and the consistencies, of the various mortars.

TABLE II

| No. | silica sol, % | w/c ratio | fresh density, $kg/m^3$ | air, % | consistency, mm |
|---|---|---|---|---|---|
| KF3 | 3 | 0.41 | 2300 | 3.02 | 135 |
| KF5 | 5 | 0.43 | 2220 | 5.9 | 130 |
| KF8 | 8 | 0.46 | 2260 | 4.70 | 130 |

Prisms having the dimensions 4×4×16 cm were cast of the mortars according to Table II. They were demoulded after 1 day, cured in water for 5 days, and in a climate room at 55% RH and 22° C. for 22 days. Flexural and compressive strengths were measured after 1, 7, and 28 days, by means of standard method SS 1342 33 and SS-EN 196-1, respectively. The results, given in MPa, are set forth in Table III below.

TABLE III

|  | KF3 | KF5 | KF8 |
|---|---|---|---|
| Compressive strength, | | | |
| 1 day | 31.4 | 33.2 | 22.3 |
| 7 days | 51.7 | 53.0 | 51.5 |
| 28 days | 63.7 | 61.7 | 64.8 |
| Flexural strength, | | | |
| 1 day | 5.88 | 6.18 | 4.31 |
| 7 days | 9.32 | 9.41 | 7.26 |
| 28 days | 12.7 | 12.1 | 10.3 |

Regarding early strength, i.e. in 1–7 days, the best results were evidently obtained with mortar KF5.

KF5 was subjected to some durability test. Chloride-ion penetration was measured by means of a method described in an article by Tang et al. entitled "Rapid determination of chloride diffusivity in concrete applying an electric field", Material Journal, Vol. 89, No. 1, page 49, The American Concrete Institute 1992, hereby incorporated be reference, and the diffusion coefficient regarding chloride-ion penetration for KF3 was determined to $3.13 \times 10^{-12}$ m$^2$/s, whereas a reference sample with no silica sol added showed a diffusion coefficient of $11.1 \times 10^{-12}$ m$^2$/s. The carbonation depth was measured by spraying phenolphthalein on a fresh broken surface, substantially perpendicular to the surface of the sample, and measuring the length of penetration indicated by the phenolphtalein. The KF3 sample showed a penetration depth of 1.49 mm after 225 hours, while a reference sample with no silica sol added showed a penetration depth of 12.2 mm after an equally long period of time. Freeze-thaw salt resistance was determined by freezing a KF3 mortar prism in a saturated NaCl solution at −20° C. for 16 hours ant then thawing it in water at ambient temperature for 8 hours. This freeze-thaw sequence was repeated a number of times, whereby each sequence was denominated "a cycle". The freeze-thaw salt resistance was estimated on basis of the weight change of the prisms after certain numbers of cycles. A reference prism with no silica sol added showed a weight loss of 20% after 11 cycles, and after 16 cycles it was broken. The KF3 prism, however, instead showed a weight gain (due to absorption of the salt solution) of about 0.3% at 16 cycles, and even at 35 cycles there was not any noticeable weight loss.

We claim:

1. A method for preparing concrete or mortar, comprising preparing a mixture of a hydraulic binder, aggregates, water, and colloidal silica, wherein a relative standard deviation of the particle size distribution by numbers of the colloidal silica is at least about 30%.

2. A method according to claim 1, wherein the silica particles have an average specific surface area, below about 200 m$^2$/g.

3. A method according to claim 2, wherein the particles have an average specific surface area of from about 50 to about 170 m$^2$/g.

4. A method according to claim 1, wherein the silica particles have a particle size distribution with a standard deviation of at least about 20 nm.

5. A method according to claim 1, wherein the silica particles have a mean particle size by numbers of from about 7 to about 50 nm.

6. A method according to claim 1, wherein the particles are added as an aqueous suspension containing from about 15 to about 50 percent by weight of silica.

7. A method according to claim 1, wherein the particles are added in an amount of from about 1 to about 8 percent by weight, calculated on the hydraulic binder.

8. A method according to claim 1, wherein the preparation of the mixture includes addition of a superplasticiser.

9. A method according to claim 8, wherein a part of the superplasticiser is added to the mixture before the silica particles.

10. A method according to claim 9, wherein the part of the superplasticiser added before the silica particles is from about 35 to about 55 weight-% based on the total amount of superplasticiser added.

11. A method according to claim 8, wherein the superplasticiser comprises a sulphonated naphthalene-formaldehyde resin, a sulphonated melamine-formaldehyde resin, or a sulphonated melamine-urea-formaldehyde resin.

12. A method according to claim 1, wherein the silica particles are stabilized against aggregation by alkali metal ions or ammonium ions.

13. A method according to claim 1, wherein no accelerator is added to the mixture.

14. A method according to claim 8, wherein the concrete or mortar is prepared by mixing, based on 100 parts by weight of hydraulic binder added, from about 100 to about 1000 parts by weight of aggregates; colloidal silica; up to about 5 parts by weight of superplasticiser; and from about 25 to about 75 parts by weight of water.

15. Concrete or mortar produced by the method according to claim 1.

16. Concrete or mortar according to claim 15, with the proviso that it is not shotcrete.

17. Concrete or mortar according to claim 15, wherein it is construction concrete.

18. Concrete or mortar according to claim 15, wherein it is mortar.

19. A method for enhancing the early strength of concrete or mortar while maintaining good long term strength comprising incorporating into the concrete or mortar a colloidal silica having a relative standard deviation of particle size of at least about 30%.

20. A method according to claim 19, wherein the concrete or mortar includes an hydraulic binder, and wherein the silica particles are incorporated into said concrete or mortar in an amount of from about 1 to about 8 percent by weight based on the weight of said hydraulic binder.

* * * * *